UNITED STATES PATENT OFFICE.

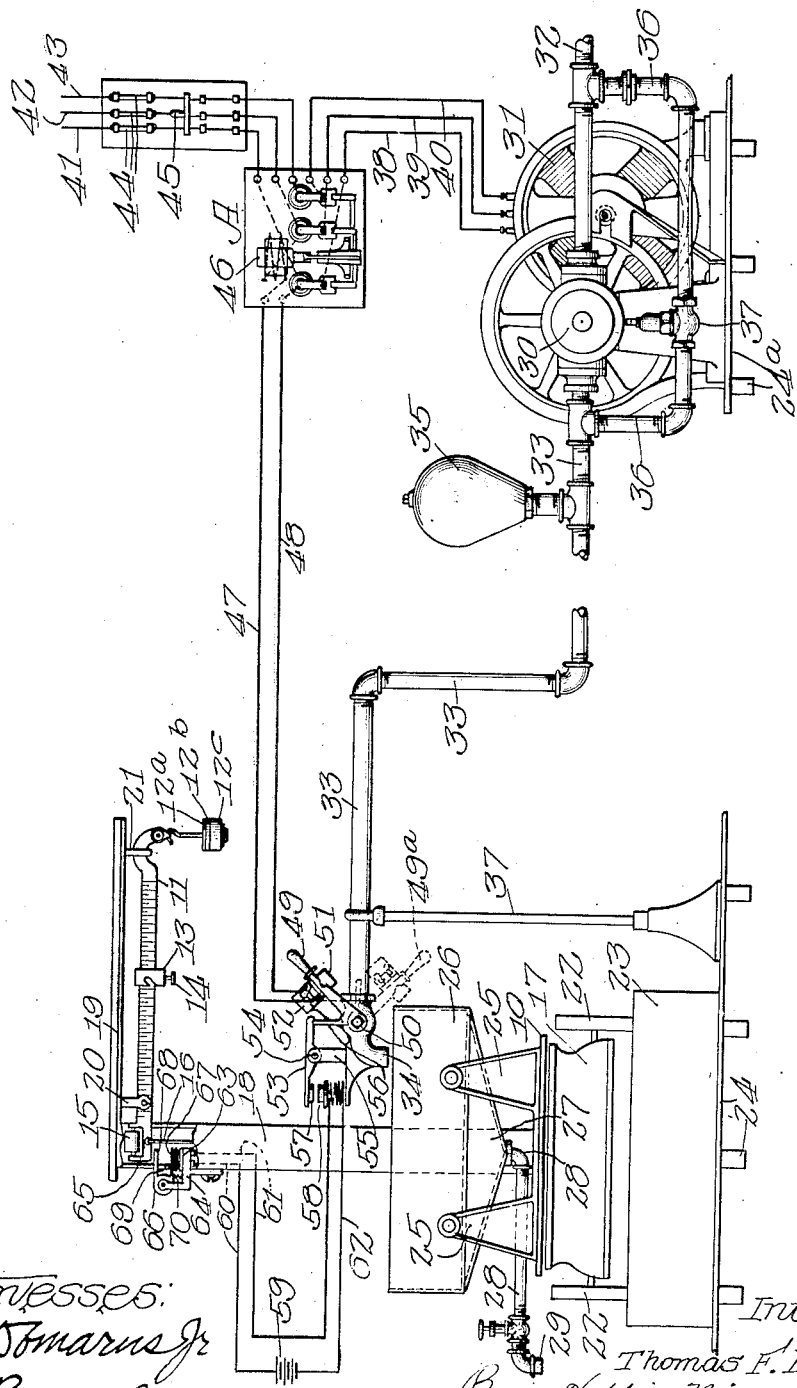

THOMAS F. MULLIGAN, OF FORT WAYNE, INDIANA, ASSIGNOR TO S. F. BOWSER & CO., INCORPORATED, OF FORT WAYNE, INDIANA.

LIQUID-WEIGHING MECHANISM.

1,116,466.  Specification of Letters Patent.  Patented Nov. 10, 1914.

Application filed February 27, 1913. Serial No. 750,940.

*To all whom it may concern:*

Be it known that I, THOMAS F. MULLIGAN, a citizen of the United States, residing at Fort Wayne, in the county of Allen and State of Indiana, have invented certain new and useful Improvements in Liquid-Weighing Mechanisms, of which the following is a specification.

My invention relates to liquid weighing mechanisms, and has for its object the provision of an improved liquid weighing mechanism which shall have means for weighing liquids, means for predetermining an amount of liquid to be weighed, means for supplying liquid to the weighing means, and means for stopping the supply of liquid when the predetermined amount has been furnished to the weighing means.

With the above and other objects in view this invention consists substantially in the combination, arrangement, and construction of parts all as hereinafter described, shown in the accompanying drawing, which forms a part of this specification and shows the preferred embodiment of my invention, and more specifically set forth in the subjoined claims.

In the drawing is shown a side elevation of my invention with portions of the upper part of the weighing means broken away.

My invention is designed to fulfil the need in the commercial world of a mechanism for measuring liquids by weight, for supplying liquid to the weighing means, for predetermining the amount of liquid to be measured, and for automatically arresting the supply of liquid when the predetermined amount has passed to the weighing mechanism.

Reference numeral 10 in the drawing indicates the platform of any well known type of platform weighing scale, 11 being the graduated scale beam thereof, $12^a$ $12^b$ and $12^c$ the ordinary weights suspended from the free end of the scale beam, 13 the weight slidably mounted upon the scale beam 11, 14 the ordinary means for securing the sliding weight 13 in any position desired upon the scale beam 11, 15 the well known adjustable balance weight for properly balancing the scales, 16 the rod connecting the platform 10 with the scale beam 11, 17 the box or bed of the platform weighing scale, 18 the ordinary upright member rising from the rearward end of the bed, and 19 the well known horizontal member to which are secured the support 20, within which the scale beam 11 is pivoted, and the stop 21, for the free end of the scale beam 11.

At 22 are indicated the wheels ordinarily used to support this type of platform scale, 23 is a stand used for convenience in elevating the weighing scale, and 24 and $24^a$ are sections of an ordinary floor upon which my invention rests.

Upon the platform 10 of the weighing scale rests a standard 25 upon which is supported a receptacle 26 for the liquid to be weighed. The receptacle 26 is provided preferably with an inclined bottom 27 for the ready draining off of the liquid, and with the lowest extremity of the receptacle 26 a valved drain pipe 28 communicates, having its discharge end 29 located in any convenient position. Liquid is supplied to the receptacle 26 by a pump 30 actuated by a motor 31, the pump receiving its liquid supply from any convenient source indicated at 32, pumping the liquid through a pipe line 33 to a faucet 34 which discharges the liquid into the receptacle 26.

35 indicates the ordinary air chamber used in connection with pumps for liquids.

The pump 30 may be any suitable form of power pump, and the motor 31 may be any suitable form of motor. For convenience a shunt pipe line 36 is provided, having the usual valve 37, and communicates from the source of supply 32 around the pump to the pipe line 33. This shunt pipe line is for the protection of the pump and the parts co-acting with it from injury in the event that the faucet 34 is closed and the pump continues to operate.

37 indicates any convenient support for maintaining the faucet 34 in a proper position to discharge liquid into the receptacle 26.

38, 39 and 40 are electrical conductors conveying electricity to the motor 31, and 41, 42, and 43 are electrical conductors acting as sources of supply for the wires 38, 39 and 40.

The action of the motor 31 is controlled through an ordinary form of remote control electric switch interposed between the wires 41, 42, 43 and the wires 38, 39, 40 and generally indicated by the letter A.

At 44 are indicated ordinary fuses inserted in the electrical conductors 41, 42 and 43 and at 45 is indicated an ordinary hand switch for breaking electrical connection between the wires 41, 42, 43 and the remote control switch A.

46 is the ordinary solenoid used for operating the remote control switch A, and 47 and 48 are electric conductors for a shunt circuit used to energize the solenoid 46 and thereby control the remote control switch A, the shunt circuit receiving its supply of electricity from two of the electric supply wires 41, 42 and 43.

49 is a handle operating the closing vane of the faucet 34 and is pivoted as at 50.

51 is a weight upon the pivoted handle 49 and placed at a sufficient distance from the pivot point 50 to command a considerable leverage upon the handle 49.

52 is any convenient form of switch, one part of which is secured to the handle 49, affording electrical communication between the wires 47 and 48 of the shunt circuit, thereby closing the shunt circuit, when the handle 49 is in the upwardly inclined position shown in solid lines in the drawing. When the handle 49 is in the upwardly inclined position shown in solid lines in the drawing, the faucet 34 is open for the discharge of liquid from the pipe line 33 into the receptacle 26. A trigger 53, centrally pivoted as at 54 upon an upright member 55, which preferably finds its support by attachment to the faucet 34, engages a stud 56 upon the pivoted handle 49 and holds the handle 49 in an upwardly inclined position for the purpose of holding open the faucet 34 and holding closed the switch 52.

At 49ª is shown in dotted lines a downwardly inclined position of the handle 49, together with the parts secured to the handle 49, in which position the faucet 34 is closed and the switch 52 remains open, breaking the electrical communication between the wires 47 and 48. The change between the upwardly inclined position of the handle 49 and the downwardly inclined position as shown in dotted lines at 49ª is effected by a breaking of the mechanical trigger connection between the trigger 53 and the stud 56, the weight 51 exerting sufficient force upon the handle 49 to pull it downwardly into the position shown in dotted lines at 49ª. For the purpose of breaking the mechanical connection between the trigger 53 and the stud 56, the end of the trigger 53 farthest from the stud 56 is provided with an armature 57. Directly below the armature 57 and spaced a suitable distance therefrom is an electro-magnet 58 energized preferably by a battery 59 through wires 60, 61 and 62.

The supply of electricity in the wires 60, 61 and 62 for energizing the electro-magnet 58 is controlled by a switch indicated at 63 secured preferably by means of a bracket 64 to the upright portion 18 of the weighing scale, the switch 63 being normally open and disposed below and spaced from the rearward end 65 of the scale beam 11. Pivotally supported in the bracket 64 is a U-shaped member 66 having approximately parallel free ends 67 and 68, the end 67 being disposed in such position that a slight downward pressure upon it will close the switch 63 and cause the electricity from the battery 59 to energize the electro-magnet 58. The end 68 of the U-shaped member 66 is so disposed with relation to the rearward end 65 of the scale beam 11 that when the weighing scale is in balance there is contact between the rearward end 65 of the scale beam 11 and the end 68 of the U shaped member 66 and sufficient pressure is exercised upon the U shaped member 66 to close the switch 63. When the rearward end 65 of the scale beam 11 is elevated from the position it assumes when the weighing scale is in balance there is no contact between the U shaped member 66 and the rearward end 65 of the scale beam. This absence of contact between the U shaped member 66 and the scale beam 11 is necessary in order that the weighing scales may have no force exerted upon them other than the liquid being weighed in the container 26 until the desired amount has been discharged into the container 26 and the weighing scale is in balance. In other words during the process of weighing, and until that process is complete, the weighing scale is undisturbed by any contact with the U shaped member 66, but when the process of weighing is complete and the weighing scales have come into balance, contact is had between the scale beam 11 and the U shaped member 66 sufficient to close the switch 63. To hold the U shaped member 66 in the proper position a stop 69 is provided preferably above and adjacent the end 67 of the U shaped member, and a compression spring member 70 is inserted between the bracket 64 and that side of the end 67 farthest from the stop 69.

In the operation of this improved liquid weighing mechanism the weights 12ª 12ᵇ 12ᶜ and 13 are so disposed upon the scale beam 11 as to indicate the predetermined amount of liquid desired to be weighed. This will cause the scale beam 11 to be elevated at its rearward end 65 out of contact with the U shaped member 66—it being presumed that the container 26 is empty. In this position of the scale beam the switch 63 not being pressed upon by the U shaped member 66, and being normally open, leaves the electro-magnet 58 deënergized. The handle 49 is now elevated to the upwardly inclined position shown in solid lines in the drawing and the trigger 53 is set upon the stud 56 thereby holding the handle 49 in this elevated position and maintaining the faucet 34 open for the passage of fluid from the pipe line 33 into the container 26, and also holding the switch 52 closed. Upon the closing of the switch 52 the solenoid 46 is energized which closes the remote control switch A, thereby supplying electrical energy to the motor 31 which immediately begins to rotate and actuate the pump 30 to force liquid through the pipe line 33 and the now open faucet 34 into the container 26

When the predetermined weight of liquid, as indicated by the position of the weights upon the scale beam, has passed into the container 26, the scale beam assumes a balanced position, in which position its rearward end 65 comes into contact with the U shaped member 66 and thereby closes the switch 63, energizing the electro-magnet 58. The energizing of the electro-magnet 58 instantly draws the armature 57 downward rocking the trigger 53 upon its pivot 54 and breaking the mechanical connection between the trigger and the stud 56, whereupon the weight 51 pulls the handle 49 downward to the position shown in dotted lines at 49ª, thereby opening the switch 52 and closing the faucet 34. The opening of the switch 52 deënergizes the solenoid 46, thereby opening the remote control switch A, arresting the supply of electrical energy to the motor 31, and stopping the action of the pump 30, while the closing of the faucet 34 prevents the further discharge of liquid into the container 26. The predetermined amount of liquid having now been discharged into the container 26 and the supply of liquid stopped, the valved drain pipe 28 may be opened and the liquid in the container 26 drawn off through the discharge end 29. The drawing off of the liquid from the receptacle 26 causes an elevation of the rearward end 65 of the scale beam 11 thereby making a clearance, as before, between the scale beam 11 and the U shaped member 66 and allowing the switch 63 to assume its normal open position, whereupon the electro-magnet 58 is deënergized and the armature 57 released from its contact with the electro-magnet leaving the trigger 53 in position to be re-connected, when desired, to the stud 56.

In the accompanying drawing and in the foregoing description are set forth the preferred embodiment of my invention, but it is obvious that any one skilled in the art may make modifications of the same without departing from the principle of the invention.

What I claim is:

1. The combination of a device for weighing liquids, appliances thereon for indicating a predetermined amount of liquid to be weighed, a source of liquid supply, a power propelled pump for forcing liquid from the source of supply to the weighing device, a faucet communicating with the pump for discharging the liquid to the weighing device, and mechanism for closing the faucet and arresting the supply of power to the pump when the predetermined amount of liquid has been furnished to the weighing device.

2. The combination of a device for weighing liquids, appliances thereon for indicating a predetermined amount of liquid to be weighed, a source of liquid supply, a power propelled pump for forcing liquid from the source of supply to the weighing device, a faucet for discharging pumped liquid to the weighing device, a pipe line for conveying liquid from the pump to the faucet, a valved shunt pipe line affording communication for liquid around the pump from the pipe line to which the faucet is attached to the source of supply, and mechanism for closing the faucet and arresting the supply of power to the pump when the predetermined amount of liquid has been furnished to the weighing device.

3. The combination of a device for weighing liquids, appliances thereon for indicating a predetermined amount of liquid to be weighed, a source of liquid supply, a power propelled pump for forcing liquid from the source of supply to the weighing device, a faucet for discharging pumped liquid to the weighing device, a pipe line for conveying liquid from the pump to the faucet, a valved shunt pipe line affording communication for liquid around the pump from the pipe line to which the faucet is attached to the source of supply, and mechanism operatively related to the faucet and controlled by the weighing device for closing the faucet and arresting the supply of power to the pump when the predetermined amount of liquid has been furnished to the weighing device.

4. The combination of a device for weighing liquids, appliances thereon for indicating a predetermined amount of liquid to be weighed, a source of liquid supply, a power propelled pump for forcing liquid from the source of supply to the weighing device, a faucet for discharging pumped liquid to the weighing device, a pipe line for conveying liquid from the pump to the faucet, an inclosed air compression chamber communicating with the pipe line, a valved shunt pipe line affording communication for liquid around the pump from the pipe line to which the faucet is attached to the source of supply, and mechanism for closing the faucet and arresting the supply of power to the pump when the predetermined amount of liquid has been furnished to the weighing device.

In testimony whereof I have signed my name to this specification, in the presence of two subscribing witnesses, on this 16th day of January A. D. 1913.

THOMAS F. MULLIGAN.

Witnesses:
J. R. MATLACK,
L. W. THOMAS.